(12) United States Patent
Ramraj et al.

(10) Patent No.: US 8,924,537 B2
(45) Date of Patent: Dec. 30, 2014

(54) BUSINESS PROCESSES TRACKING

(75) Inventors: Anupriya Ramraj, Granite Bay, CA (US); Craig Robert Shanks, Fleet (GB); Maurice Haman Abraham, Reading (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 12/878,684

(22) Filed: Sep. 9, 2010

(65) Prior Publication Data

US 2012/0066370 A1   Mar. 15, 2012

(51) Int. Cl.
| | | |
|---|---|---|
| G06F 15/173 | (2006.01) | |
| H04L 12/64 | (2006.01) | |
| G06Q 10/08 | (2012.01) | |
| G06Q 10/10 | (2012.01) | |
| G06Q 30/00 | (2012.01) | |
| G06Q 30/04 | (2012.01) | |
| G06Q 40/00 | (2012.01) | |

(52) U.S. Cl.
CPC .......... *H04L 12/6418* (2013.01); *G06Q 10/087* (2013.01); *G06Q 10/10* (2013.01); *G06Q 30/01* (2013.01); *G06Q 30/04* (2013.01); *G06Q 40/00* (2013.01)
USPC ................. 709/224; 709/200; 705/7; 705/75

(58) Field of Classification Search
USPC ................................. 709/200, 224; 705/7, 75
See application file for complete search history.

(56) References Cited

U.S. PATENT DOCUMENTS

| | | | | |
|---|---|---|---|---|
| 6,405,176 | B1* | 6/2002 | Toohey | 705/26.8 |
| 7,065,566 | B2* | 6/2006 | Menard et al. | 709/223 |
| 7,783,745 | B1* | 8/2010 | Bhargava et al. | 709/224 |
| 8,010,654 | B2* | 8/2011 | Hunt et al. | 709/224 |
| 8,402,095 | B2* | 3/2013 | Beauchamp et al. | 709/206 |
| 2003/0145080 | A1 | 7/2003 | Breese et al. | |
| 2004/0049365 | A1 | 3/2004 | Keller et al. | |
| 2005/0080639 | A1* | 4/2005 | Tang | 705/1 |
| 2006/0004852 | A1 | 1/2006 | Abraham et al. | |
| 2006/0095276 | A1* | 5/2006 | Axelrod et al. | 705/1 |
| 2006/0106626 | A1* | 5/2006 | Jeng et al. | 705/1 |
| 2007/0260735 | A1 | 11/2007 | Olsson et al. | |
| 2007/0266149 | A1* | 11/2007 | Cobb et al. | 709/224 |
| 2007/0294209 | A1* | 12/2007 | Strub et al. | 707/1 |

(Continued)

OTHER PUBLICATIONS

Insider's guide to HP real-user montioring, Proactively manage the customer's quality of experience and accelerate time to resolution, Nov. 2008, 8 pages, Available at www.hp.com/go/btosoftware.

(Continued)

*Primary Examiner* — Anthony Mejia
(74) *Attorney, Agent, or Firm* — Brooks, Cameron & Heubsch, PLLC; Jason P. Lorfing (57) ABSTRACT

Systems, methods, and machine readable and executable instructions are provided for business process tracking. Business process tracking can include collecting data from network traffic. Instances of the data can include a number of events, a session identifier, and user information. The data can be filtered to a reduced number of events with a network monitoring engine. A number of business process event identifiers corresponding to the reduced number of events can be defined in a network adaptor. An individual instance of the business process can be distinguished according to the session identifier and the user information. The individual instance of the business process can be tracked independent of a number of applications running on the network.

15 Claims, 5 Drawing Sheets

(56) References Cited

U.S. PATENT DOCUMENTS

| | | |
|---|---|---|
| 2008/0082375 A1* | 4/2008 | Kennis et al. ............... 705/7 |
| 2008/0155089 A1* | 6/2008 | Hunt et al. ............... 709/224 |
| 2008/0243912 A1* | 10/2008 | Azvine et al. ............ 707/103 R |
| 2008/0288599 A1* | 11/2008 | Kutchmark et al. ......... 709/206 |
| 2009/0106149 A1* | 4/2009 | Bennett et al. ............... 705/42 |
| 2009/0216874 A1* | 8/2009 | Thain et al. ............... 709/224 |
| 2009/0222325 A1* | 9/2009 | Anderson et al. ............ 705/10 |
| 2010/0063856 A1* | 3/2010 | Williams et al. ............... 705/7 |
| 2010/0077078 A1* | 3/2010 | Suit et al. ............... 709/224 |
| 2010/0088404 A1* | 4/2010 | Mani et al. ............... 709/224 |
| 2011/0022707 A1* | 1/2011 | Bansal et al. ............... 709/224 |
| 2011/0029657 A1* | 2/2011 | Gueta et al. ............... 709/224 |
| 2011/0270957 A1* | 11/2011 | Phan et al. ............... 709/221 |
| 2011/0270973 A1* | 11/2011 | Liao ............... 709/224 |
| 2011/0314148 A1* | 12/2011 | Petersen et al. ............ 709/224 |
| 2011/0320586 A1* | 12/2011 | Maltz et al. ............... 709/224 |
| 2012/0079105 A1* | 3/2012 | Hoffman ............... 709/224 |

OTHER PUBLICATIONS

HP Business Process Insight for the Windows Operating System Software Version: 7.50, Concepts Guide, Jun. 2008, Available at http://h20230.www2.hp.com/selfsolve/manuals, 50 pages.

* cited by examiner

BUSINESS PROCESSES TRACKING

BACKGROUND

Business processes may be important to the functioning of an organization. A business process may be a collection of related, structured activities and/or tasks that produce a specific service or product for a number of customers and/or markets. A business process may begin with a customer's desire and, hopefully, end with the fulfillment of that desire. Activities of a business process may affect the bottom line of an organization, thus monitoring the business process may be beneficial in providing feedback to enable optimization of the business process.

A business process may span multiple applications and may flow across multiple subdivisions of an organization using diverse hardware and/or software to implement the applications. For instance, a business maintaining an online store may include a telecommunications subdivision including employees and/or applications for order receipt and processing and a supply chain subdivision including employees and/or applications for producing and/or distributing a product to fulfill the orders.

A business application may include hardware and/or software to facilitate business activities. For instance, a business may have an electronic inventory system, an electronic order processing system, on online store, among other business applications. Business applications may be instrumented to monitor a business process using point-products but this does not guarantee full coverage and tracking due to the diverse nature of applications and a lack of monitoring products to track all business processes.

DETAILED DESCRIPTION

Embodiments of the present disclosure may include methods, systems, and machine readable and executable instructions and/or logic. Business process tracking can include collecting data from network traffic. Instances of the data can include a number of events, a session identifier, and user information. The data can be filtered to a reduced number of events with a network monitoring engine. A number of business process event identifiers corresponding to the reduced number of events can be defined in a network adaptor. An individual instance of the business process can be distinguished according to the session identifier and the user information and any other relevant payload data collected from the network traffic. The individual instance of the business process can be tracked independent of a number of applications running on the network and without requiring the underlying business applications to be modified.

Monitoring a business process by instrumenting applications running on the network may not offer a complete picture of the business process due to potentially diverse technologies present in such applications and the lack of monitoring products for all of such applications. Tracking individual instances of a modeled business process based on network data without instrumentation at the application level can provide a more robust solution for business process tracking.

Various tools (e.g., computing devices) exist to monitor network traffic (e.g., TCP packets), and provide various reports based on the monitored network traffic.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. As used herein, the designators "A," "N," and "M" particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 132 may reference element "32" in FIG. 1, and a similar element may be referenced as 232 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
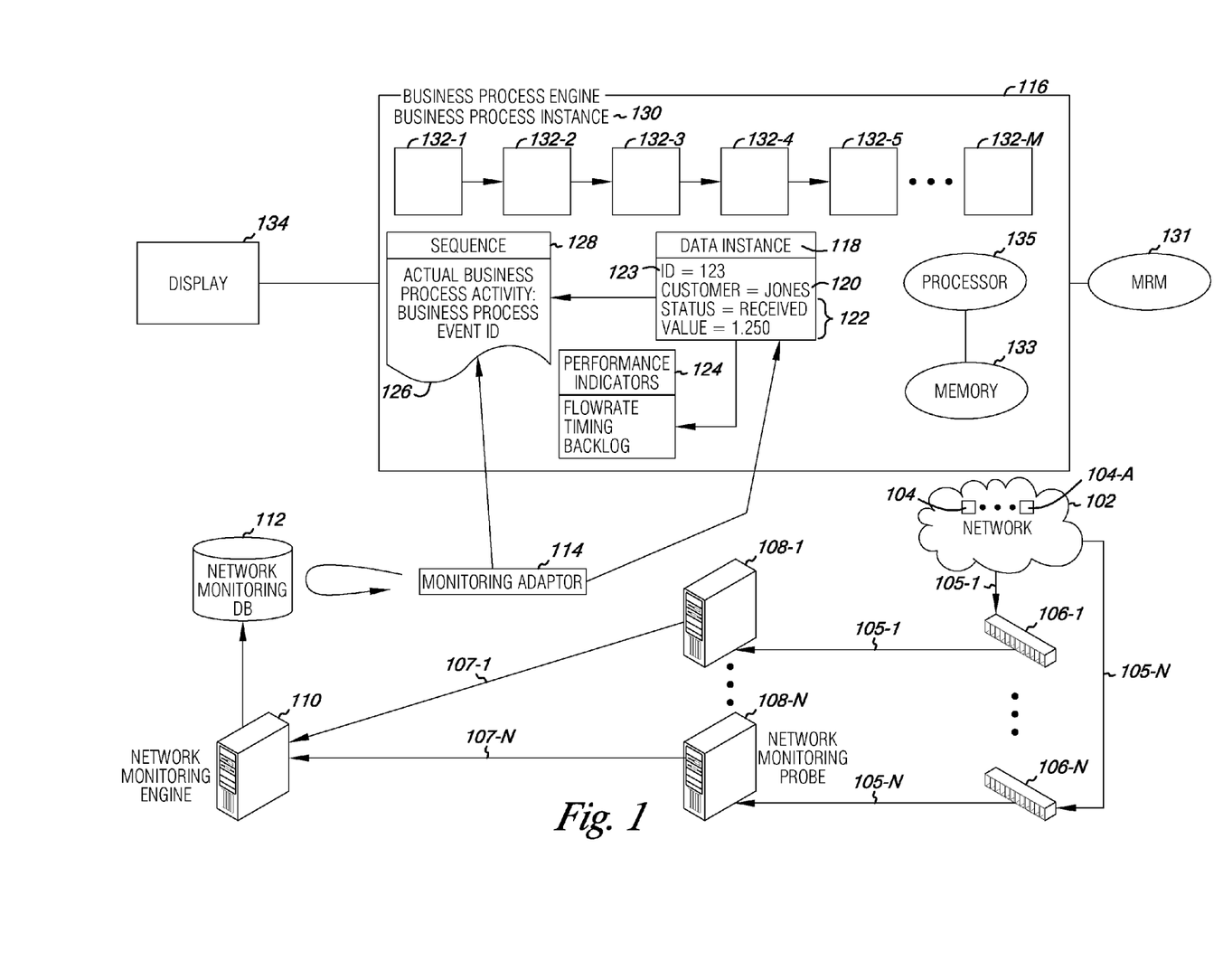
FIG. 1 illustrates a block diagram of an example of a system for business process tracking according to the present disclosure.

FIG. 1 illustrates a block diagram of an example of a system for business process tracking according to the present disclosure. The system includes a network 102. The network 102 can include a number of local area networks (LANs), a public network (e.g., the Internet), and/or a number of private networks. The network 102 can include a number of applications 104-1, . . . , 104-A running thereon. Such applications 104-1, . . . , 104-A can include applications such as website hosting, inventory management, email management, Internet connectivity, file management, and databases, among others. Such applications can be provided by a machine such as a computing device (e.g., a server).

Such machines can include processor 135 and memory 133 resources for executing instructions stored in a tangible non-transitory medium and/or an application specific integrated circuit (ASIC) including logic configured to perform various examples of the present disclosure. A machine (e.g., a computing device) can include and/or receive a tangible non-transitory machine readable medium 131 storing a set of machine readable instructions (e.g., software). Although, with respect to FIG. 1, only the business process engine 116 is specifically illustrated as including processor 135 and memory 133 resources with a machine readable medium 131, a number of machines (e.g., computing devices such as servers) can include the same for use with examples of the present disclosure. As used herein, processor 135 resources can include one or a plurality of processors such as in a parallel processing system. Memory 133 resources can include memory addressable by the processor 135 resources for execution of machine readable instructions. The machine readable medium 131 can include volatile and/or non-volatile memory such as random access memory (RAM), magnetic memory such as a hard disk, floppy disk, and/or tape memory, a solid state drive (SSD), flash memory, phase change memory, etc.

The system can include a network monitoring probe 108-1, ..., 108-N to collect data 107-1, ..., 107-N from network traffic 105-1, ..., 105-N. Network traffic 105-1, ..., 105-N can be collected with the network monitoring probe 108-1, ..., 108-N directly from the network 102 (e.g., where the network monitoring probe 108-1, ..., 108-N is connected directly to the network 102 and receives network traffic therefrom) and/or the network traffic 105-1, ..., 105-N can be mirrored to a network monitoring engine 110. For example, mirroring the network traffic 105-1, ..., 105-N can include the use of a network monitoring device and/or application 106-1, ..., 106-N (e.g., a port sniffer application running on a network device such as a switch). Examples of the present disclosure can include one network monitoring probe 108-1 or a plurality of network monitoring probes 108-1, ..., 108-N. Those examples including a plurality of network monitoring probes 108-1, ..., 108-N can include more than one probe for the network 102, but do not include network monitoring probes 108-1, ..., 108-N specific to each application 104-1, ..., 104-A on the network 102 (e.g., what is being monitored is network traffic, not applications). Whether a particular example includes one network monitoring probe 108-1 or a plurality of network monitoring probes 108-1, ..., 108-N, the data 107-1, ..., 107-N collected from the network traffic 105-1, ..., 105-N can be filtered with a network monitoring engine 110.

The network monitoring probe 108-1, ..., 108-N, and/or the network monitoring device and/or application 106-1, ..., 106-N can be communicatively coupled (e.g., wired or wireless) to the network 102 from within a local intranet of the business providing the business service. The network monitoring probe 108-1, ..., 108-N and/or the network monitoring device and/or application 106-1, ..., 106-N can be a discrete computing device having processor and memory resources, can be an application running on a separate computing device such as a server, router, switch, etc., or can be provided by another implementation. Such implementations can help to alleviate potential network security concerns associated with collecting network traffic 105-1, ..., 105-N (e.g., as opposed to collecting network traffic from outside of the local intranet of the business providing the business service). In various examples, network traffic 105-1, ..., 105-N can be collected from behind a firewall. In some examples, all network traffic 105-1, ..., 105-N associated with business applications provided by the business can be collected. For example, the network monitoring probe 108-1, ..., 108-N can monitor a plurality of requests and responses sent over transmission control protocol/Internet protocol (TCP/IP) on the network 102.

Data 107-1, ..., 107-N can be collected from the network traffic 105-1, ..., 105-N without instrumenting the business applications 104-1, ..., 104-A running on the network 102 (e.g., without receiving data from instruments associated with the applications 104-1, ..., 104-A). Even for examples where a number of the applications 104-1, ..., 104-A are instrumented, the data 107-1, ..., 107-N can be collected without making use of any data associated with such instrumentation. Such application instrumentation may not offer a complete picture of the business process due to potentially diverse technologies present in such applications 104-1, ..., 104-A and the lack of monitoring products for all of such applications 104-1, ..., 104-A. Tracking individual instances 130 of a modeled business process based on network traffic 105-1, ..., 105-N without instrumentation at the application level can provide a more robust solution for business process tracking.

Instances 118 of the data 107-1, ..., 107-N can include a session identifier (ID) 123 and/or user information 120, among other information 122. Examples of such other information 122 can include a status (e.g., received) and/or a value (e.g., 1.250), among others. The session ID 123 can be unique to a particular instance 130 of a business process (e.g., the network traffic 105-1, ..., 105-N associated with a series of events, such as the process of a customer ordering a book online can have a unique session ID, where the series of events can include, for example, an account login, an order for the book, and payment information). The user information 120 can be specific to a particular user (e.g., customer). Thus, for an individual instance 130 of a business process, each event in the individual instance 130 of the business process can have a common session ID 123 and common user information 120.

The network monitoring engine 110 can filter the data 107-1, ..., 107-N to a reduced number of events (e.g., a more easily managed set of events that can be used for tracking purposes). The network monitoring engine 110 can be a discrete computing device including processor and memory resources and or logic to provide the functionality thereof. A text pattern event can be used to identify payload data associated with an instance 118 of the data 107-1, ..., 107-N. Continuing the example described above, an example of a text pattern event for the business process could be "book cost is $8.99." Text pattern events can be used to identify that a book has been ordered in general, however, a specific web page or sequence of web pages can also be used to identify that a specific order complete transaction has taken place. In general, a text pattern event can occur in the data 107-1, ..., 107-N (e.g., in Hyper Text Markup Language HTML pages associated with a web server hosting an online storefront).

The data 107-1, ..., 107-N and/or the number of events can be stored in a network monitoring database 112. The network monitoring database 112 can be provided by a discrete computing device, or can be associated with another computing device (e.g., the network monitoring engine 110). A monitoring adaptor 114 can extract data corresponding to the number of text pattern events from the network monitoring database 112. The present disclosure is not limited to the example implementation described herein with respect to the network monitoring database 112.

The monitoring adaptor 114 can store a number of defined business process event identifiers 132-1, 132-2, 132-3, 132-4, 132-5, ..., 132-M corresponding 126 to the reduced number of events. The monitoring adaptor 114 can sequence 128 the number of defined business process event identifiers (referred to generally herein as 132) to correspond to a sequence of a number of actual business process activities. A particular one 132-1 of the number of defined business process events can indicate a current place in the business process for a specific instance 130 of the business process. The number and/or definition of the business process event identifiers 132 can be particular to a specific business process. For example, the number of business process event identifiers 132 can include "account login with user information 132-1," "item added to cart 132-2," "inventory checked/confirmed 132-3," "payment information submitted 132-4," and "order confirmed 132-M," however examples of the present disclosure are not so limited. The monitoring adaptor 114 can be communicatively coupled to a business process engine 116 to provide the correspondence 126 of the number of defined business process event identifiers 132 with the reduced number of events and to provide the sequence 128 of the number of defined business process event identifiers 132 thereto.

The business process engine 116 can be provided by a discrete computing device having processor and memory resources. The business process engine 116 can distinguish an individual instance 130 of the business process according to the session identifier 123 and the user information 120 collected from the network traffic 105-1, ..., 105-N. The business process engine 116 can track the individual instance 130 of the business process independent of a number of applications 104-1, ..., 104-N running on the network 102 (e.g., without receiving data from instruments associated with the number of applications 104-1, ..., 104-N).

To facilitate sequencing, the business process can be modeled in the business process engine 116. Modeling can include identifying a number of actual business process activities comprising the business process and correlating the number of actual business process activities with the number of business process event identifiers 132 (e.g., when they occur during the modeled business process).

In some examples, the business process engine 116 can measure business process metrics by tracking a plurality of instances 130 of the business process and set performance indicators 124 for one or more of a flow rate, a value, a timing, and a backlog of the plurality of instances 130 of the business process. For example, a performance indicator 124 for a flow rate can represent a quality for the amount of time it takes to complete a plurality of instances 130 of the business service, a performance indicator 124 for value can represent a quality for the dollar value of a particular instance 130 of the business process, a performance indicator 124 for timing can represent a quality for the amount of time it takes to complete a specific event of the business process, and a performance indicator 124 for a backlog can represent a quality for the amount of instances 130 of the business process that are delayed by processing of other instances 130 of the business process. A threshold can be set for a performance indicator 124 and an alert can be provided in response to the threshold being breached. For example, a threshold of ten instances of the business process can be set for the performance indicator 124 for backlog. If more than ten instances of the business process are backlogged, then an alert can be raised. Such information can be useful to provide a snapshot and reporting of how well the business process is performing in addition to alerting on the same based upon thresholds. The alert can be provided visually (e.g., via a graphical user interface) or audibly (e.g., via a beep) among other methods.

The business process engine 116 can be coupled to a display 134 for displaying information to a user of the business process engine 116. The connection between the business process engine 116 and the display 134 need not be direct (e.g., the display 134 may be coupled to a computing device connected remotely to the business process engine 116). For example, performance indicators 124, among other business tracking information, can be output to the display 134. Such examples can be useful to provide a complete end-to-end picture of the business process.

Figure 2:
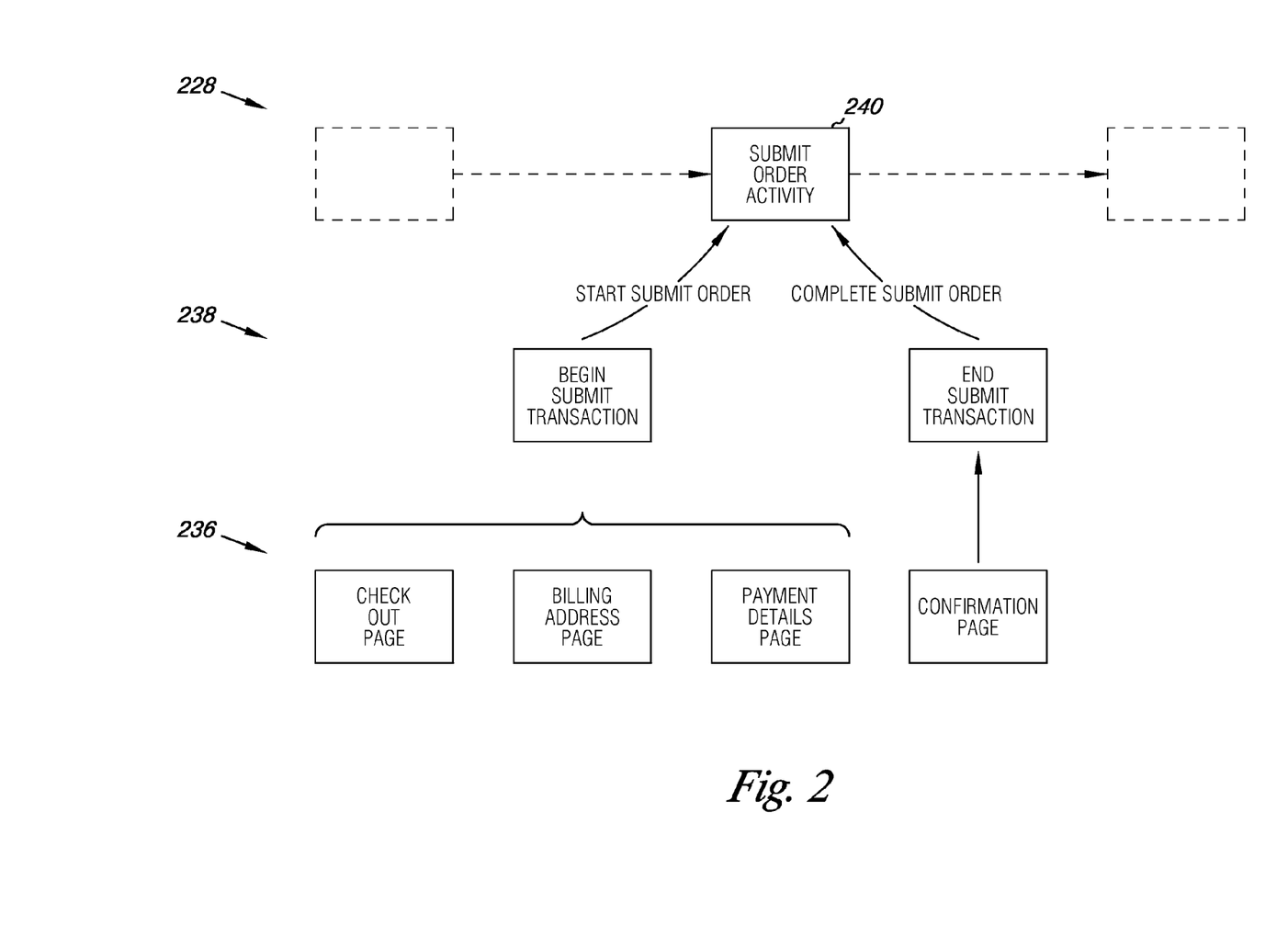
FIG. 2 illustrates a block diagram of an example of business process tracking according to the present disclosure.

FIG. 2 illustrates a block diagram of an example of business process tracking according to the present disclosure. The block diagram includes a number of HTML pages 236 including, for example, "check out page," "billing address page," "payment details page," and "confirmation page." The number of HTML pages 236 can be provided by a website server of the business. Although described as "HTML" pages 236, examples are not so limited such website pages can be provided by languages other than HTML. In general, the HTML Pages 236 can have various network traffic associated therewith and data can be collected therefrom (e.g., with a number of network monitoring probe 108-1, ..., 108-N as illustrated in FIG. 1) as described herein. An operator of a network monitoring probe can "name" the HTML pages 236. Such naming can assist with filtering text pattern events from the data associated with the network traffic associated with the HTML pages 236.

The HTML pages 236 can be classified 238. For example, "check out page," "billing address page," and "payment details page" can be classified as "begin submit transaction" while "confirmation page" can be classified as "end submit transaction." Such classification 238 can be associated with filtering the data to a reduced number of events (e.g., with a network monitoring engine 110 as illustrated in FIG. 1). That is, for example, a collection of data associated with a number of HTML pages can be filtered to a more generic description.

The classification 238 of HTML pages can be linked with an actual business process activity 240 from a sequence 228 of actual business process activities 240. For example, "begin submit transaction" and "end submit transaction" can be linked with the actual business process activity 240 "submit order activity." Such classification 238 of HTML pages 236 and linking to an actual business process activity 240 can represent a position in a sequence 228 of actual business process activities that is inferred at the business process tracking level from the data collected and filtered from the network traffic as described herein. A network monitoring probe can detect and classify HTML page 236 activity based on the network monitoring probe's configuration. A business process engine can pick up on such classification and track where in the business process a particular customer is.

Figure 3:
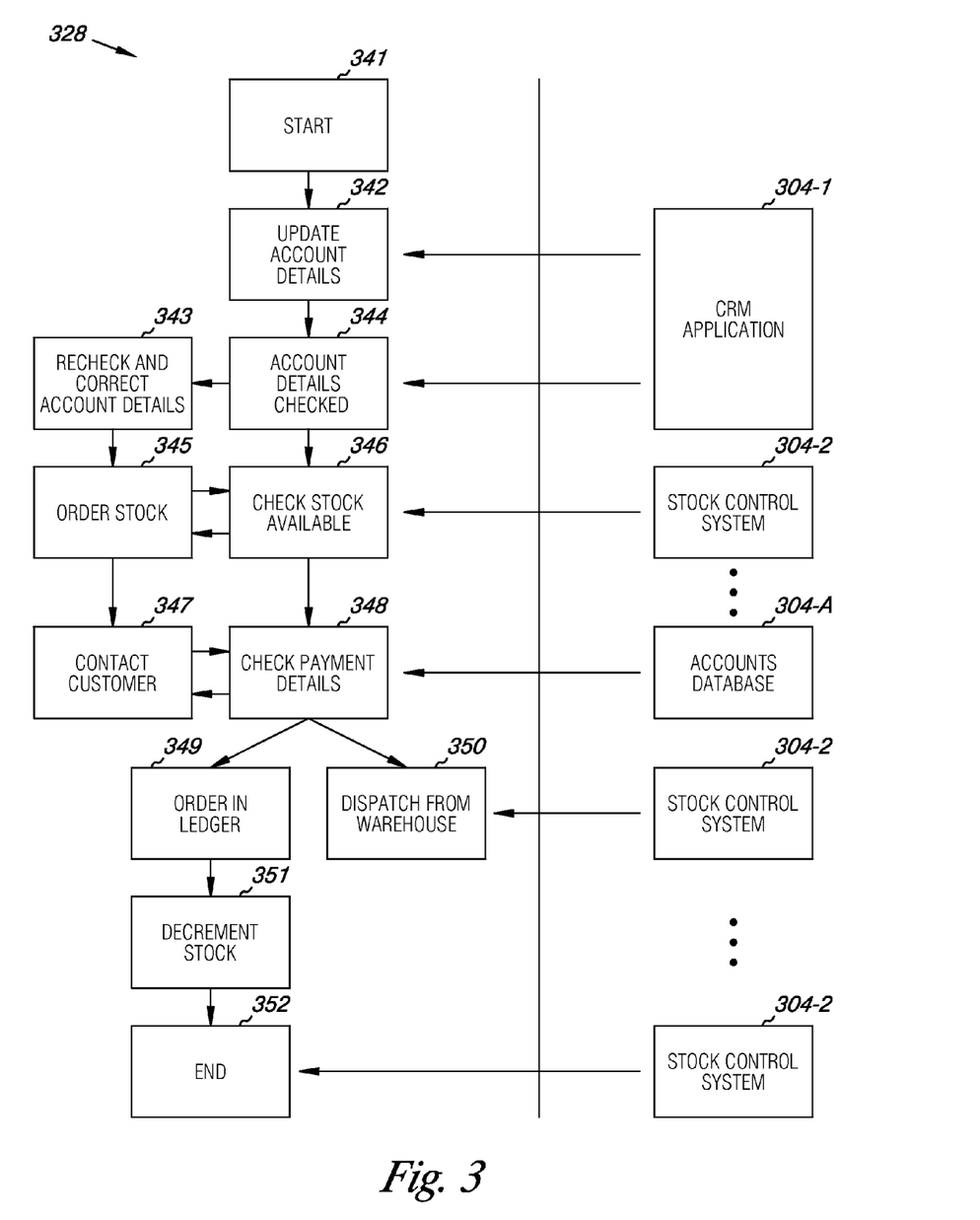
FIG. 3 illustrates a block diagram of an example of a business process sequence that can be used for business process tracking according to the present disclosure.

FIG. 3 illustrates a block diagram of an example of a business process sequence 328 that can be used for business process tracking according to the present disclosure. The block diagram includes a sequence 328 of actual business process activities 342-351, which can correspond to a sequence of business process event identifiers (e.g., business process event identifiers 132-1, ..., 132-M illustrated in FIG. 1). In this example, the actual business process activities 342-351 include update account details 342, recheck and correct account details 343, account details checked 344, order stock 345, check stock available 346, contact customer 347, check payment details 348, order in ledger 349, dispatch from warehouse 350, and decrement stock 351. The actual business process activities 342-351 are interconnected with directional arrows to show the expected direction of the flow and the order in which the actual business process activities 342-351 are expected to be completed according to this example, but the directional arrows themselves have no effect on how the work flow is progressed, which is being defined by entry and exit conditions associated with each of the actual business process activities 342-351.

Along with the actual business process activities 342-351, there are illustrated other activities such as start activity 341 and end activities such as end activity 352. Each actual business process activity 342-351 can have separate criteria for entry and exit and assumes an active state when the entry criteria are met and remains in the active state until the end criteria are met, in which event it assumes a "completed" state. The entry and exit criteria define respectively the conditions under which each separate actual business process activity 342-351 is deemed to have started and to have been completed and serve to drive progress through the business process sequence 328.

It is possible to define business process activities 342-351 that have the same exit criteria as entry criteria and that are completed as soon as they are activated; for example as in the case of decrementing a stock total 351. Actual business process activities 342-351 can have directional arrows entering and leaving them. Start activities 341 are the normal start point for a flow (e.g., business process) and can have directional arrows leaving them, but not entering them. End activities 352 are the normal end point for a flow and can have directional arrows entering them, but not leaving them. When an end activity 352 meets its exit condition, a business process engine (e.g., business process engine 116 in FIG. 1) stops tracking the instance of the business process except for out of sequence events that continue to be tracked.

Tracking a business process sequence 328 of the above-described type does not need to include all the activities that take place or are carried out in the actual business process (e.g., each actually business process event does not have to correspond to a business process event indicator). Rather the business process sequence 328 may reflect only those actual business process activities that are to be tracked in order to understand whether the process is functioning properly.

The business process sequence 328 example illustrated in FIG. 3 can be used for an organization that provides products that can be sent from a physical location. In the example, the organization has a number of applications such as, customer relationship management system 304-1, a stock control system 304-2, and an accounts database 304-A. Customer relationship management system 304-1, stock control system 304-2 and accounts database 304-A are external machines (e.g., computing systems) that may historically have been provided with instrumentation (not shown) that could serve to generate event streams transmitted via event adaptors to a business process engine. However, according to one or more examples of the present disclosure, business process tracking can be performed without instrumenting such applications and/or without using information derived from instrumenting such applications. Such examples can be beneficial, as described herein, because, for example, such instrumentation does not necessarily offer a complete picture of the business process due to diverse technologies prevalent in such information technology (IT) systems and a potential lack of instrumentation for each relevant system component and/or conflicts between different instrumentation.

Figure 4:
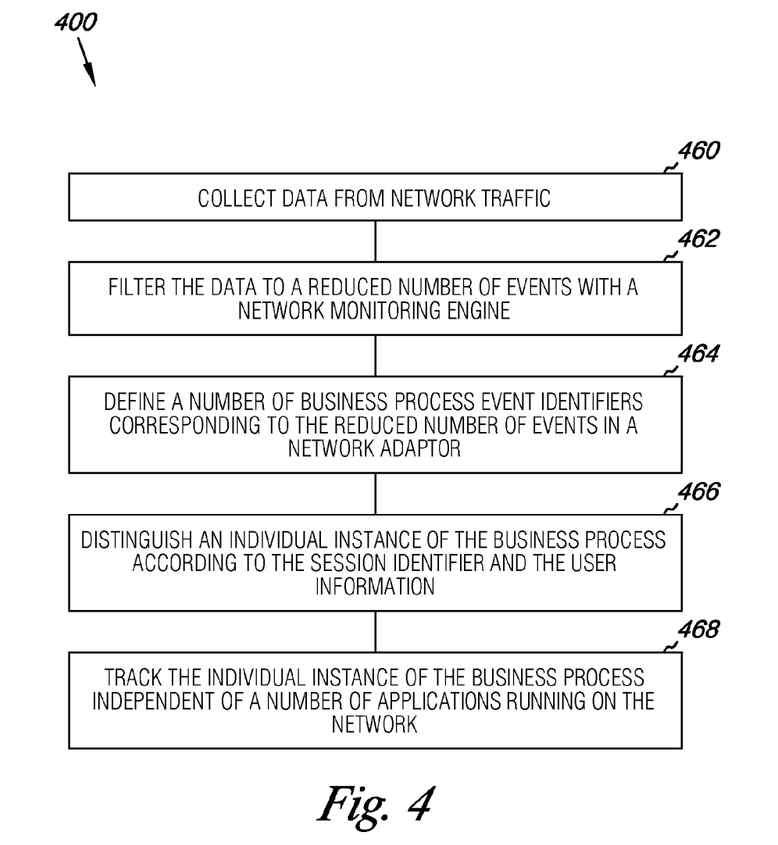
FIG. 4 provides a flow chart illustrating an example of a method for business process tracking according to the present disclosure.

FIG. 4 provides a flow chart illustrating an example of a method 400 for business process tracking according to the present disclosure. Data can be collected from network traffic, as illustrated at 460. The data can be filtered for a number of text pattern events with a network monitoring engine, as illustrated at 462. A number of business process event identifiers corresponding to the number of text pattern events can be defined in a network adaptor, as illustrated at 464. An individual instance of the business process can be distinguished according to the session identifier and the user information as illustrated at 466. The individual instance of the business process can be tracked independent of a number of applications running on the network as illustrated at 468.

Machine readable and executable instructions and/or logic, which are operable to perform the method described in connection with FIG. 4, can be present in whole or in part in the examples of other figures. Embodiments, however, are not limited to the particular examples given herein.

Figure 5:
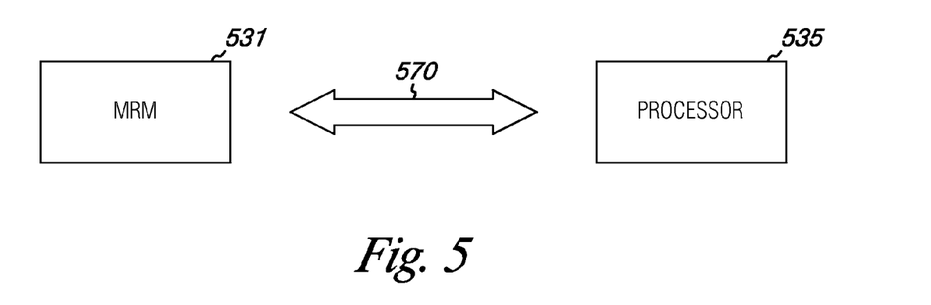
FIG. 5 illustrates a block diagram of an example of a machine readable medium in communication with processor resources according to the present disclosure.

FIG. 5 illustrates a block diagram of an example of a machine readable medium 531 in communication with processor 535 resources according to the present disclosure. A machine (e.g., a computing device) can include and/or receive a tangible non-transitory machine readable medium (MRM) 531 storing a set of machine readable instructions (e.g., software) for business process tracking, as described herein. As used herein, processor 535 resources can include one or a plurality of processors such as in a parallel processing system. The machine readable medium 131 can include volatile and/or non-volatile memory such as random access memory (RAM), magnetic memory such as a hard disk, floppy disk, and/or tape memory, a solid state drive (SSD), flash memory, phase change memory, etc.

The MRM 531 can be in communication with the processor 535 resources via a communication path 570. The communication path 570 can be local or remote to a machine associated with the processor 535 resources. Examples of a local communication path 570 can include an electronic bus internal to a machine such as a computer where the MRM 531 is one of volatile, non-volatile, fixed, and/or removable storage medium in communication with the processor 535 resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 570 can be such that the MRM 531 is remote from the processor 535 resources such as in the example of a network connection between the MRM 531 and the processor 535 resources (e.g., the communication path 570 can be a network connection). Examples of such a network connection can include a local area network (LAN), a wide area network (WAN), a personal area network (PAN), the Internet, among other examples of networks. In such examples, the MRM 531 may be associated with a first machine (e.g., a server) and the processor resources 535 may be associated with a second machine (e.g., a computing device). The first and second machines can be in communication via a networked communication path 570.

Figure 6:
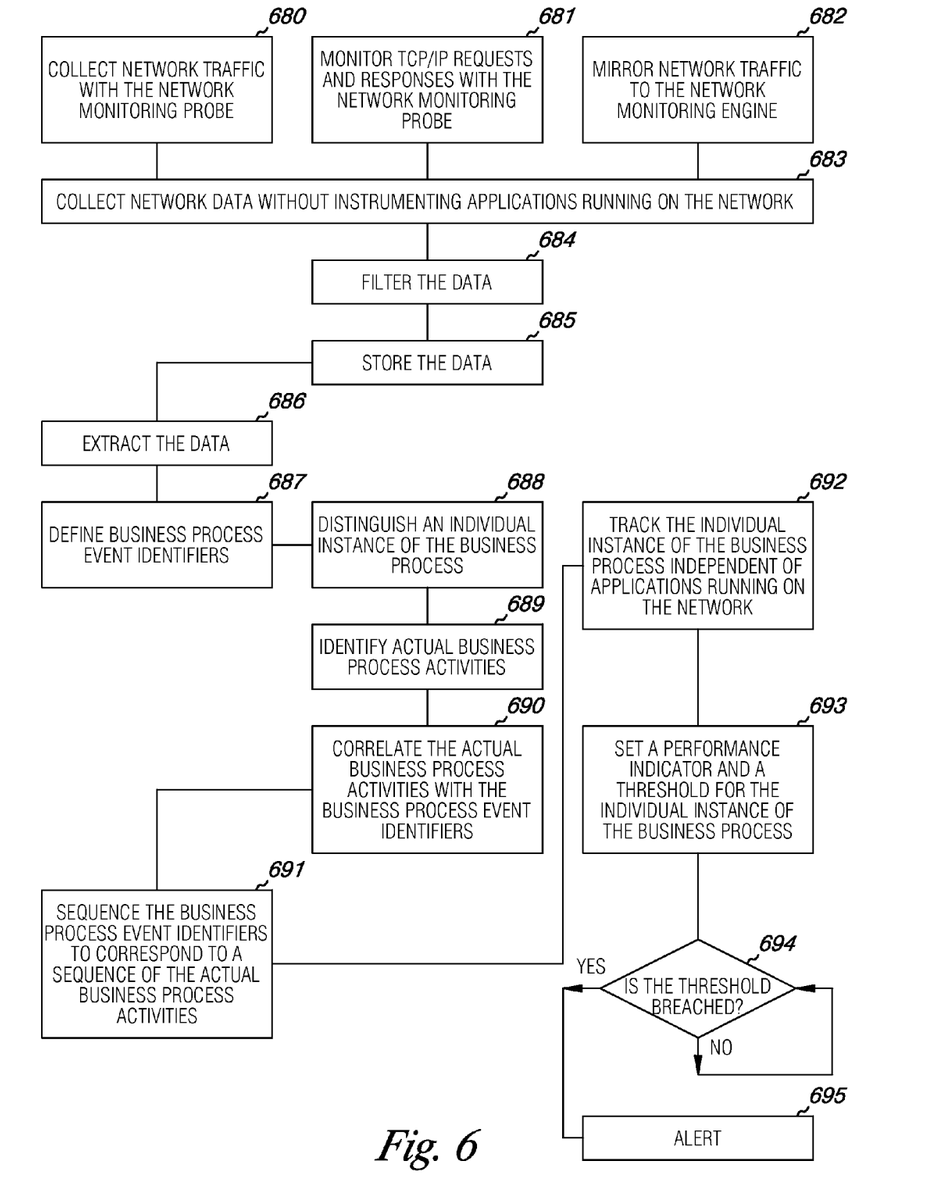
FIG. 6 provides a flow chart illustrating an example of a method for business process tracking according to the present disclosure.

FIG. 6 provides a flow chart illustrating an example of a method for business process tracking according to the present disclosure. As illustrated at 683, network data can be collected without instrumenting applications running on the network. Examples of such collection can include collecting network traffic with the network monitoring probe, as illustrated at 680, monitoring TCP/IP requests and responses with the network monitoring probe, as illustrated at 681, and mirroring network traffic to the network monitoring engine, as illustrated at 682.

The data can be filtered, as illustrated at 684. For example, the data can be filtered to a reduced number of events using a network monitoring engine. The data can be stored, as illustrated at 685. For example, the data can be stored in a network monitoring database.

The data can be extracted, as illustrated at 686. For example, the data can be extracted from the network monitoring database by a network adaptor. Business process event identifiers can be defined, as illustrated at 687. For example, the business process event identifiers can be defined in a network adaptor and can correspond to the reduced number of events (e.g., according to the filtered data).

An individual instance of the business process can be distinguished, as illustrated at 688. For example, the individual instance of the business process can be distinguished according to the session identifier and user information collected with the data. Actual business process activities can be identified, as illustrated at 689. The actual business process activities can be correlated with the business process event identifiers, as illustrated at 690. Identification of the actual business process activities and correlation of the same with the business process event identifiers can be included in modeling the business process.

The business process event identifiers can be sequenced to correspond to a sequence of the actual business process activities, as illustrated at 691. For example, the business process event identifiers can be sequenced with the network adaptor.

The individual instance of the business process can be tracked independent of applications running on the network, as illustrated at 692. A performance indicator and a threshold for the performance indicator can be set for the individual instance of the business process, as illustrated at 693. A determination can be made as to whether the threshold is breached, as illustrated at 694. If the threshold is breached, an alert can be raised, as illustrated at 695.

It is to be understood that the above description has been made in an illustrative fashion, and not a restrictive one. Although specific examples have been illustrated and described herein, other component arrangements, instructions, and/or device logic can be substituted for the specific examples shown.

What is claimed:

1. A method for business process tracking, comprising:
   collecting data from network traffic, wherein instances of the data include a number of events, a session identifier, and user information;
   filtering the data to a reduced number of events with a network monitoring engine;
   defining a number of business process event identifiers corresponding to the reduced number of events in a network adaptor;
   distinguishing an individual instance of the business process according to the session identifier and the user information; and
   tracking the individual instance of the business process, without instrumentation at the application level, independent of a number of applications running on the network without receiving data from instruments associated with the number of applications.

2. The method of claim 1, wherein tracking the individual instance of the business process independent of the number of applications running on the network comprises tracking the individual instance of the business process without instrumenting the number of applications running on the network.

3. The method of claim 1, wherein collecting the network traffic includes one of:
   collecting the network traffic with a network monitoring probe; and
   mirroring the network traffic to the network monitoring engine.

4. The method of claim 1, wherein the method includes: storing the data in a network monitoring database; and
   extracting data corresponding to the reduced number of events from the network monitoring database with the network adaptor.

5. The method of claim 4, wherein the method includes modeling the business process, wherein modeling includes:
   identifying a number of actual business process activities comprising the business process; and
   correlating the number of actual business process activities with the number of business process event identifiers.

6. The method of claim 5, wherein the method includes sequencing the number of business process event identifiers with the network adaptor to correspond to a sequence of a number of actual business process activities.

7. The method of claim 1, wherein the method includes monitoring a plurality of requests and responses sent over transmission control protocol / Internet protocol (TCP/IP) on the network with a network monitoring probe.

8. The method of claim 1, wherein:
   collecting data from the network traffic includes collecting data from the network traffic with a plurality of network monitoring probes; and
   filtering the data collected by the plurality of network monitoring probes with the network monitoring engine.

9. The method of claim 1, wherein tracking the individual instance of the business process includes:
   setting a performance indicator and a threshold for the performance indicator for the individual instance of the business process; and
   alerting in response to the threshold being breached.

10. A tangible non-transitory medium storing a set of machine readable instructions for business process tracking, which when executed by a machine, cause the machine to:
    distinguish a plurality of instances of a business process according to a plurality of events, session identifiers, and user information in a plurality of instances of data collected from network traffic by a network monitoring probe;
    wherein the plurality of instances of data are filtered to a reduced number of events; and
    wherein the reduced number of events correspond to a number of defined business process event identifiers; and
    track the plurality of instances of the business process, without instrumentation at the application level, independent of receiving data from instruments associated with a number of applications running on the network without receiving data from instruments associated with the number of applications.

11. The medium of claim 10, wherein the instructions cause the machine to set performance indicators for one or more of a flow rate, a value, a timing, and a backlog of the plurality of instances of the business process.

12. The medium of claim 10, wherein the number of business process event identifiers are sequenced to correspond to a sequence of a number of actual business process activities.

13. A system for business process tracking, comprising:
    a network monitoring probe having a processing resource, including a processor, to collect data from network traffic, wherein instances of the data include a number of events, a session identifier, and user information;
    a network monitoring engine to filter the data to a reduced number of events;
    a network monitoring database to store the data;
    a network adaptor to:
        store a number of defined business process event identifiers corresponding to the reduced number of events;
        extract data corresponding to the reduced number of events from the network monitoring database; and
        sequence the number of business process event identifiers to correspond to a sequence of a number of actual business process activities;
    a business process engine to:
        distinguish an individual instance of the business process according to the session identifier and the user information; and
        track the individual instance of the business process, without instrumentation at the application level, independent of a number of applications running on the network without receiving data from instruments associated with the number of applications.

14. . The system of claim 13, wherein the business process engine tracks individual instance of the business process without instrumenting the number of applications running on the network.

15. The system of claim 13, wherein the business process engine distinguishes and tracks a plurality of instances of the business process and sets performance indicators for one or more of a flow rate, a value, a timing, and a backlog of the plurality of instances of the business process.

\* \* \* \* \*

UNITED STATES PATENT AND TRADEMARK OFFICE
CERTIFICATE OF CORRECTION

| | |
|---|---|
| PATENT NO. | : 8,924,537 B2 |
| APPLICATION NO. | : 12/878684 |
| DATED | : December 30, 2014 |
| INVENTOR(S) | : Anupriya Ramraj et al. |

Page 1 of 1

It is certified that error appears in the above-identified patent and that said Letters Patent is hereby corrected as shown below:

In the Claims

In column 11, line 3, in Claim 14, delete "14.." and insert -- 14. --, therefor.

Signed and Sealed this
Fifth Day of May, 2015

Michelle K. Lee
*Director of the United States Patent and Trademark Office*